US010686356B2

(12) United States Patent
Sommerhalter, Jr.

(10) Patent No.: US 10,686,356 B2
(45) Date of Patent: *Jun. 16, 2020

(54) CONTROLLED MOTION SYSTEM HAVING END TEETH TO FACILITATE THE FORMATION OF A MAGNETIC FLUX BRIDGE JOINING LINEAR MOTOR SECTIONS

(71) Applicant: ROCKWELL AUTOMATION TECHNOLOGIES, INC., Mayfield Heights, OH (US)

(72) Inventor: Frederick A. Sommerhalter, Jr., Oyster Bay, NY (US)

(73) Assignee: Rockwell Automation Technologies, Inc., Milwaukee, WI (US)

( * ) Notice: Subject to any disclaimer, the term of this patent is extended or adjusted under 35 U.S.C. 154(b) by 236 days.

This patent is subject to a terminal disclaimer.

(21) Appl. No.: 15/894,284

(22) Filed: Feb. 12, 2018

(65) Prior Publication Data

US 2018/0166964 A1    Jun. 14, 2018

Related U.S. Application Data

(63) Continuation of application No. 14/560,975, filed on Dec. 4, 2014, now Pat. No. 9,906,110.

(51) Int. Cl.
*H02K 41/03*    (2006.01)
*B60L 13/03*    (2006.01)
(Continued)

(52) U.S. Cl.
CPC ............ *H02K 41/031* (2013.01); *B60L 13/03* (2013.01); *B65G 54/02* (2013.01); *B65G 2207/30* (2013.01); *H02K 1/14* (2013.01)

(58) Field of Classification Search
CPC ... H02K 41/031; H02K 41/0356; H02K 41/02
(Continued)

(56) References Cited

U.S. PATENT DOCUMENTS 7,057,312 B2 * 6/2006 Hodzic ................. H02K 41/03
310/12.01
7,224,089 B2 * 5/2007 Morel .................. H02K 41/031
310/12.01
(Continued)

FOREIGN PATENT DOCUMENTS

DE       20003518 U1    8/2000
EP       1655824 A1     5/2006
(Continued)

OTHER PUBLICATIONS

Extended EP Search Report for EP Application No. 15197747.7 dated May 18, 2016; 7 Pages.

*Primary Examiner* — Hanh N Nguyen
(74) *Attorney, Agent, or Firm* — Fletcher Yoder, P.C.

(57) ABSTRACT

A linear controlled motion system include a track formed from one or more track sections and having at least one mover mounted to the track and effective for receiving articles at one location and transporting the articles to another location. The system includes at least one magnetic linear motion motor for providing a magnetic field effective for moving each mover in a controlled motion along the track and a magnetic flux bridge for reducing changes in the magnetic flux that reduces the efficiency or interferes with the operation of the controlled motion system. The ends of each track section of the magnetic linear motion motor may include end teeth that have a small recess in the top portion thereof. The recesses may be sized to fit the lip of a cover placed over the track section so that the ends of each track section form substantially smooth and planar surfaces that (Continued)

may be joined together to substantially eliminate any air gap between the joined track sections.

20 Claims, 11 Drawing Sheets

(51) Int. Cl.
  *B65G 54/02* (2006.01)
  *H02K 1/14* (2006.01)
(58) Field of Classification Search
  USPC .................................... 310/15, 12.01–12.33
  See application file for complete search history.

(56) References Cited

U.S. PATENT DOCUMENTS

| | | |
|---|---|---|
| 8,258,656 B2 | 9/2012 | Hoppe |
| 9,906,110 B2 * | 2/2018 | Sommerhalter, Jr. ........................ H02K 41/031 |
| 2008/0111439 A1 | 5/2008 | Huang et al. |

FOREIGN PATENT DOCUMENTS

| | | |
|---|---|---|
| EP | 2779390 A2 | 9/2014 |
| GB | 2095044 A | 9/1982 |
| WO | 2008116857 A2 | 10/2008 |

* cited by examiner

CONTROLLED MOTION SYSTEM HAVING END TEETH TO FACILITATE THE FORMATION OF A MAGNETIC FLUX BRIDGE JOINING LINEAR MOTOR SECTIONS

CROSS-REFERENCE TO RELATED APPLICATION

This application is a continuation of and claims priority to U.S. patent application Ser. No. 14/560,975, which was filed on Dec. 4, 2014, which is incorporated by reference herein in its entirety for all purposes.

BACKGROUND

The present disclosure relates generally to controlled motion systems and, more specifically, to controlled motion systems having more than one linear motor section and a technique of joining the linear motor sections together using a magnetic flux bridge such that the likelihood of interruption or a change in the level of magnetic flux between the linear drive sections is reduced.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

There are many processes that benefit from providing the controlled motion of one object relative to another. For example, assembly lines have been used for well over 100 years to facilitate rapid and efficient production. In a typical assembly line, an article being manufactured moves from one station to another, typically via a conveyor belt or by some other motorized means. As the semi-finished article moves from one work station to another, parts are added or processes are performed until the final product is completed. In addition to this type of assembly automation, controlled motion systems may also be used for packaging, transporting objects, machining, etc. Conveyor belts typically use an endless belt that is stretched between a motor and one or more idlers, which results in a relatively high number of moving parts and associated mechanical complexity. Moreover, each item on a conveyor belt necessarily moves at the same speed and in the same spaced apart relationship relative to other items on the conveyor belt. Similarly, ball screws and many other types of linear motion systems also rely upon rotary motors to produce linear motion, and they suffer from similar problems.

The application of controlled electromagnetic motion systems to a wide variety of processes, such as those mentioned above, provides the advantage of increasing both the speed and flexibility of the process. Such controlled motion systems may use linear motors that employ a moving magnetic field to move one or more elements along a path. The movable element is sometimes known as a carriage, pallet, tray, or mover, but all such movable elements will be referred to here collectively as a "mover." Such linear motors reduce or eliminate the need for gear heads, shafts, keys, sprockets, chains and belts often used with traditional rotary motors. This reduction of mechanical complexity may provide both reduced cost and increased speed capability by virtue of reducing inertia, compliance, damping, friction and wear normally associated with more conventional motor systems. Further, these types of controlled motion systems may also provide greater flexibility than rotary motor systems by allowing each individual mover to be independently controlled along its entire path.

Electromagnetic controlled motion systems typically use interconnected track sections, where each section has a plurality of individually controlled coils that provide independent control of one or more movers that travel along the track. Such systems include a positioning system that often employs a plurality of linear encoders spaced at fixed positions along the track and linear encoder strips mounted on each mover to sense their position. Such linear encoders are typically "incremental absolute" position encoders that are coupled to a controller or counter, and that operate by sensing and counting incremental pulses (or that digitize sine/cosine signals to create these pulses) to count up or down after a mover has traveled past a reference point. These incremental encoders, however, can provide an absolute position signal only after performing a homing and commutation alignment procedure for each mover at power up. This requires moving each mover a certain distance along the track to find the zero reference position and the magnetic pole positions.

Presently, such controlled motion systems utilizing electromagnetic linear motors suffer from a particular deficiency. Specifically, tracks are generally assembled by combining individual track sections, such that each section is adhered or connected to an adjacent section along their contact surfaces, such as by use of an epoxy or other such material, and then covered or encased in stainless steel or similar material. During actual use of the system, a mover travels along the track from section to section through employment of a magnetic field created by the individually controlled coils positioned along each section of the track. Often, in the region where the mover leaves one section of the track and reaches the next section, there is typically a disturbance or weakening in the magnetic field that results in a relatively large increase in resistance (often referred to as cogging) as compared to the magnetic field in the middle of a section. This disruption or weakening in the magnetic field is the result of an air gap along the contact surfaces of the assembled track sections generally caused by non-precise milling of the adjacent track sections so exposed cores do not magnetically touch, or the result of the epoxy or other non-magnetic covering creating a substantially non-magnetic gap between the individual track sections. This disruption or weakening in the magnetic field between adjacent track sections is problematic in that it often leads to lost performance, noise, or false readings along the track. Further, when a mover experiences a disruption or weakening in the magnetic field during operation of the motion control system, the counting process by the controller or counter is often lost or the pulse counting is disrupted. This requires the movers to be driven back to a reference point or home position to initialize or reset the counting process. This initialization or resetting of the counting process may result in loss of production time.

Accordingly, what is needed is a controlled motion system having one or more linear motors positioned along a track formed from two or more sections such that the likelihood of interruption or the level of disturbance or weakening in the magnetic field along and between adjacent linear motor sections is reduced or minimized.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a controlled motion system includes a track that is formed from two or more track sections that are positioned adjacent to one another. Each track section includes a linear motor that is configured to produce a magnetic flux to cause one or more movers mounted on the track to move along the track. Each linear motor includes a stator having a plurality of teeth, and electromagnetic coils are disposed about at least some of these teeth to create the electromagnetic field that causes the movers to move along the track. The end of each stator includes a base portion and an end tooth that is configured to abut against the base portion and end tooth of an adjacent stator in a substantially flush manner to improve magnetic "contact" between adjacent linear motor sections and to reduce any disturbances in magnetic flux between linear motor sections.

The upper portion of each end tooth may include a recess that is configured to accept a lip of a cover that is placed over the linear motor to complete each track section. The recess in each of the end teeth is configured to be substantially equal to the width of the lip of the cover so that the end portions of adjacent covers are are also substantially flush and in contact with one another when two adjacent track sections are joined together. Since the covers are typically made from a magnetically permeable material such as stainless steel, the lips of the covers facilitate the magnetic "contact" between the adjacent linear motors and contribute to the reduction in magnetic flux disruption between adjacent linear motor sections.

To facilitate more efficient manufacture of the track sections, the upper end of the opposing sides of each track section may include a groove to accept the edges of the cover. The grooves along one side may be fairly deep, while the grooves along the opposing side may be fairly shallow. Thus, when the cover is to be placed on the track section, one edge of the cover may be placed into the deep groove, then the other edge of the cover may be snapped into place in the relatively shallow groove.

BRIEF DESCRIPTION OF THE DRAWINGS

In the present disclosure, reference is made in the following description to the accompanying drawings, in which.

DETAILED DESCRIPTION

Figure 1:
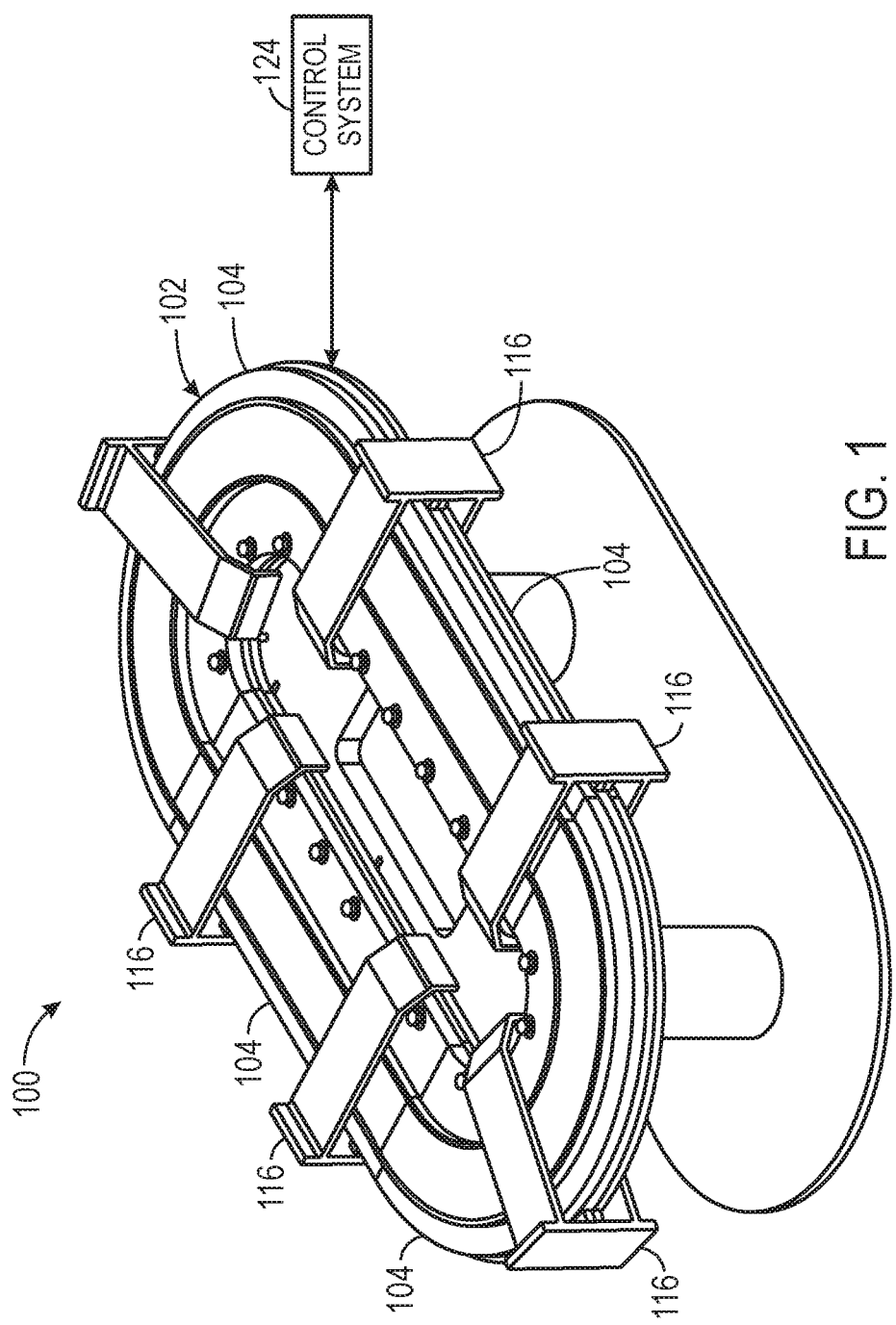
FIG. 1 is a schematic representation of a linear controlled motion transport system including a linear magnetic motor system, a track formed from at least two track sections and having at least one mover effective for moving along the track.
Figure 2:
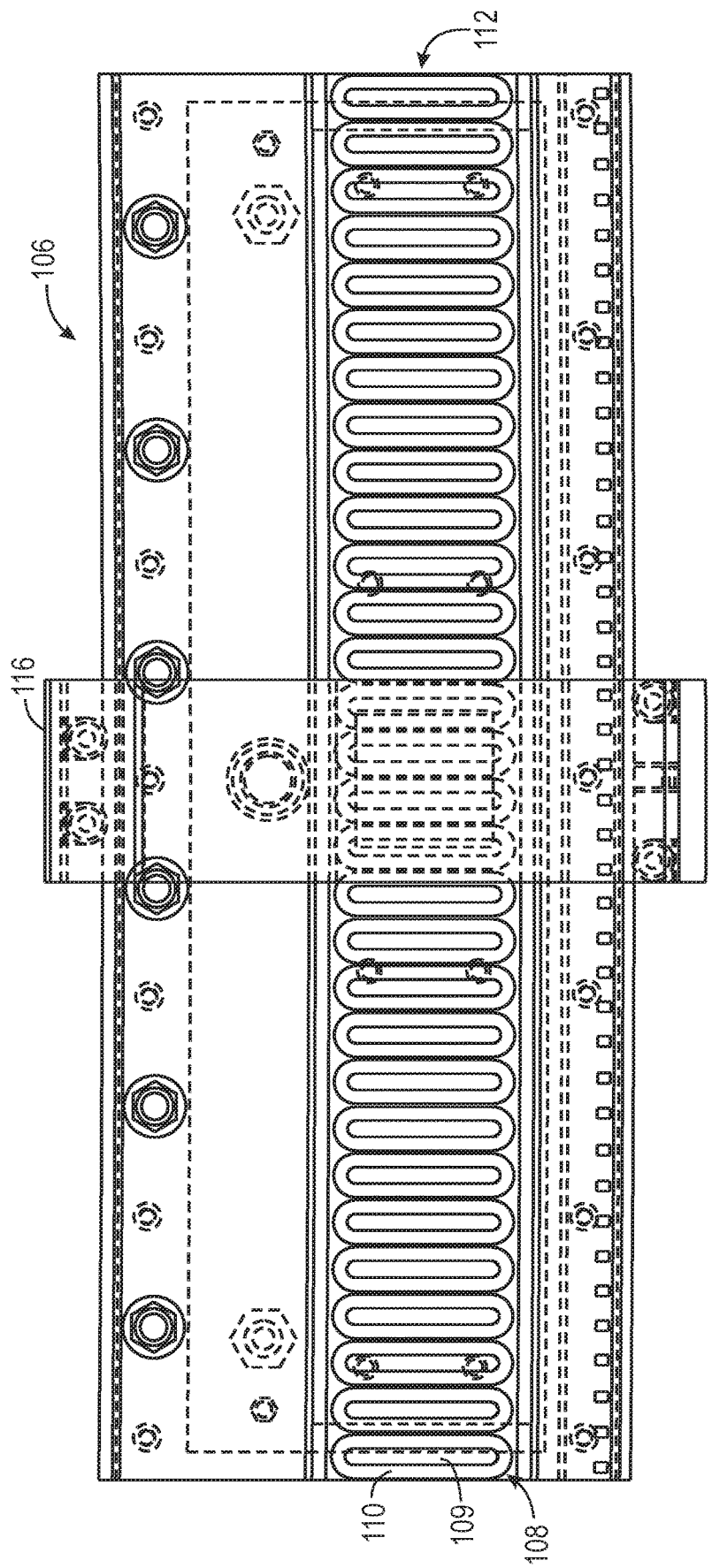
FIG. 2 is a schematic illustration of a side view of a track section of the linear motion track of FIG. 1 showing a plurality of electromagnet coils coupled to a stator and a mover mounted for movement along the track section.
Figure 3:
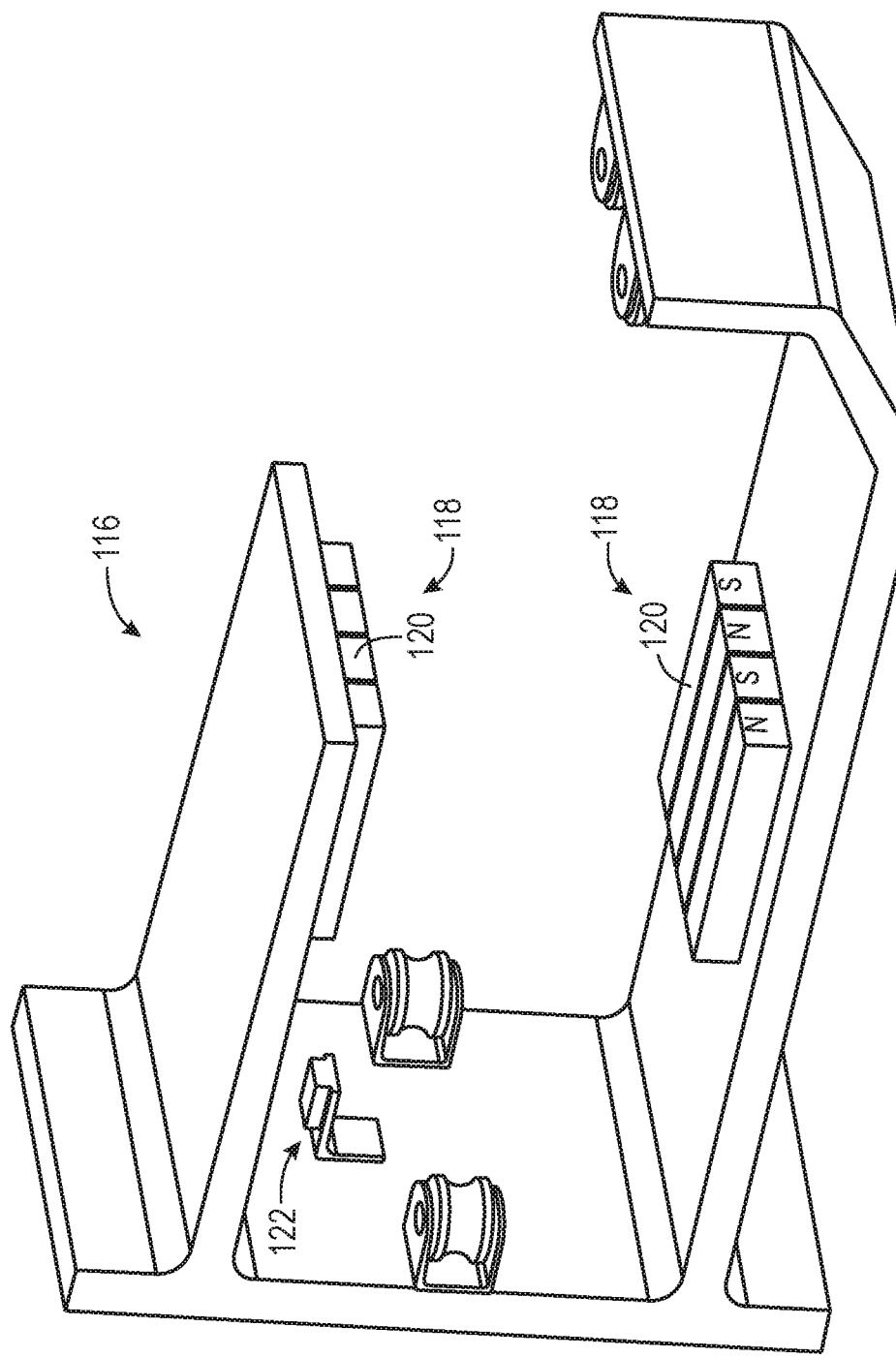
FIG. 3 is a schematic illustration of a perspective view of a mover having reaction elements mounted thereon which cooperate with the activation elements positioned along the track of FIG. 1 and further showing a control sensor for providing a signal for use by a control system in moving the mover along the track.

The present disclosure relates to a linear controlled motion system, such as a system having a track formed from one or more track sections, and having at least one mover mounted to the track and effective for receiving articles at one location and transporting the articles to another location. The system includes at least one magnetic linear motion motor for providing a magnetic field effective for moving each mover in a controlled motion along the track. The controlled motion system includes a magnetic flux bridge for reducing changes in the magnetic flux that would otherwise reduce the efficiency or interfere with the operation of the controlled motion system. In the present disclosure, specific terminology will be resorted to for the sake of clarity. However, the technology and concepts are not intended to be limited to the specific terms so selected, and it is to be understood that each specific term includes all technical equivalents that operate in a similar manner to accomplish a similar purpose.

Referring to FIGS. 1 through 4, a schematic representation of a linear controlled motion system 100 is illustrated. It should be appreciated that the term "linear" as used herein is meant to refer to electromagnetic motor systems that use electric motors that have their stators and rotors "unrolled" so that instead of producing a torque or rotation, they produce a force along their length. Hence, a linear controlled motion system 100, such as the oval system illustrated in FIG. 1, may include portions that curve side to side, upwardly, or downwardly, to form a path to move a mover from one position to another, while still being considered to be formed from "linear" motor sections (as opposed to rotary motors).

As illustrated, the linear controlled motion system may include a track 102 formed from two or more interconnected track sections 104 having a magnetic motor system 106 having activation elements 108, such as a plurality of electromagnet coils 110 coupled to teeth 109 of a stator 112 mounted along the track sections 104. The electromagnet coils 110 operate to create an electromagnetic field illustrated by magnetic flux lines 114. Coupled to the track 102 is at least one mover 116 mounted to permit travel along the track 102. Each mover 116 is controlled and may generally move independent of other movers. Reaction elements 118 may include one or more magnets 120, such as rare-earth permanent magnets. The reaction elements 118 on each mover 116 cooperate with the activation elements 108 positioned along the track 102 to produce relative movement therebetween when the activation elements 108 are energized and/or de-energized. Each mover 116 further includes a control sensor 122 that provides a signal for use by a control system 124 for operating the motor system 106 by energizing and/or de-energizing the activation elements 108 positioned along the track 102 thereby producing controlled movement of each mover 116.

Figure 5:
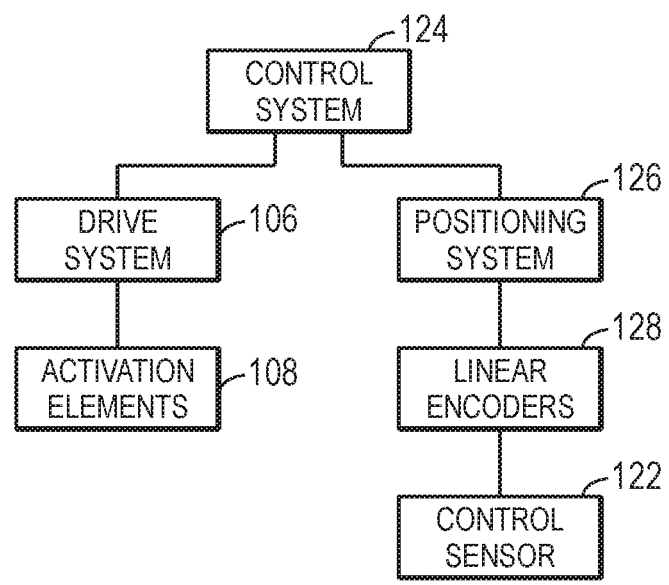
FIG. 5 is an illustration of a block diagram of an example of the control system interacting with the motor system and positioning system of the control circuitry.

In one embodiment, as illustrated in FIG. 5, the controlled motion system 100 includes a positioning system 126 that employs a plurality of linear encoders 128 spaced at fixed positions along the track 102, and that cooperate with the control sensor 122 mounted on each mover 116 to provide signals to the control system 124 for sensing each mover's position along the track 102. Each control sensor 122 may include a linear encoder, such as an "incremental absolute" position encoder, that is coupled to the control system 124, and that operates to sense and count incremental pulses (or digitize sine/cosine signals to create these pulses) after a mover 116 has traveled past a reference point (not shown)).

Figure 4:
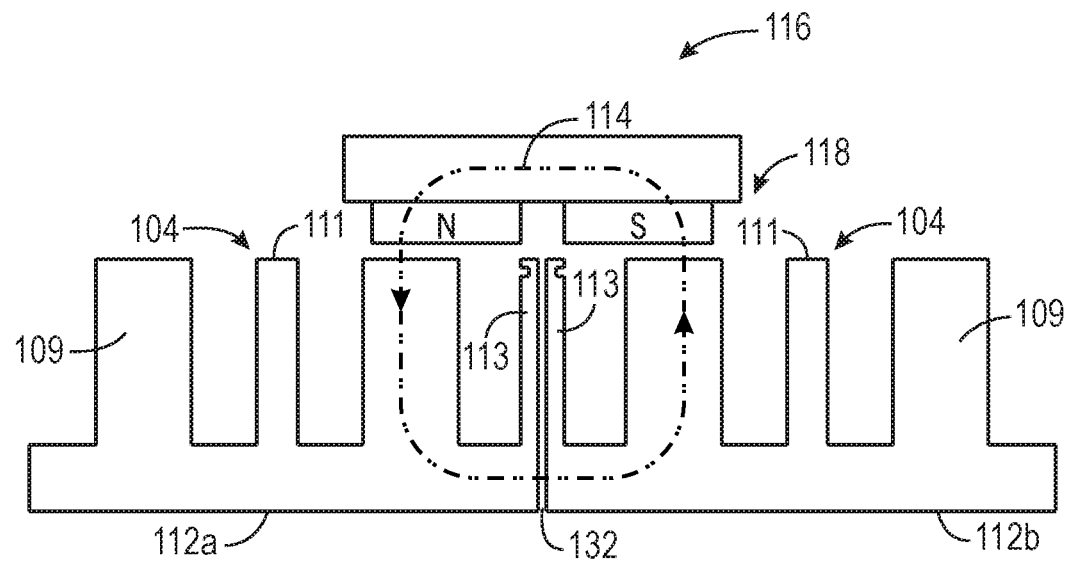
FIG. 4 is a schematic illustration showing a gap between the two adjacent track sections that can create a disturbance, change, or weakening in the magnetic field along the two adjacent track sections.

Referring to FIG. 4, a portion of the track 102 is shown having two adjacent interconnected track sections 104 and a plurality of electromagnetic coils 110 formed along stators 112 that are mounted along the track sections 104, and that operate to create an electromagnetic field mounted along each track section 104, as illustrated by magnetic flux lines 114 forming a closed loop with the mover 116 and the adjacent track sections 104. As shown, a gap 132, such as an air gap, exists between the track sections 104. Some gap, or a gap at some point between the sections may be useful, however, to facilitate securement of mechanical elements, such as a cover (not shown). However, the gap can create weakening or change in the magnetic flux across the gap 132. This disruption or change in the magnetic field between the adjacent track sections 104 is problematic in that it may lead to lost performance, noise, false readings, or unwanted interaction of movers along the track 102. Further, when a mover 116 experiences a change or weakening in the magnetic field during operation of the control motion system 100, the control sensor 122 may sense this change or weakening such that the counting process performed by the control system 124 may be lost or the pulse counting disrupted. Such disruptions may also require the movers 116 to be driven back to a reference point or home position to initialize or reset the counting process.

Figure 6:
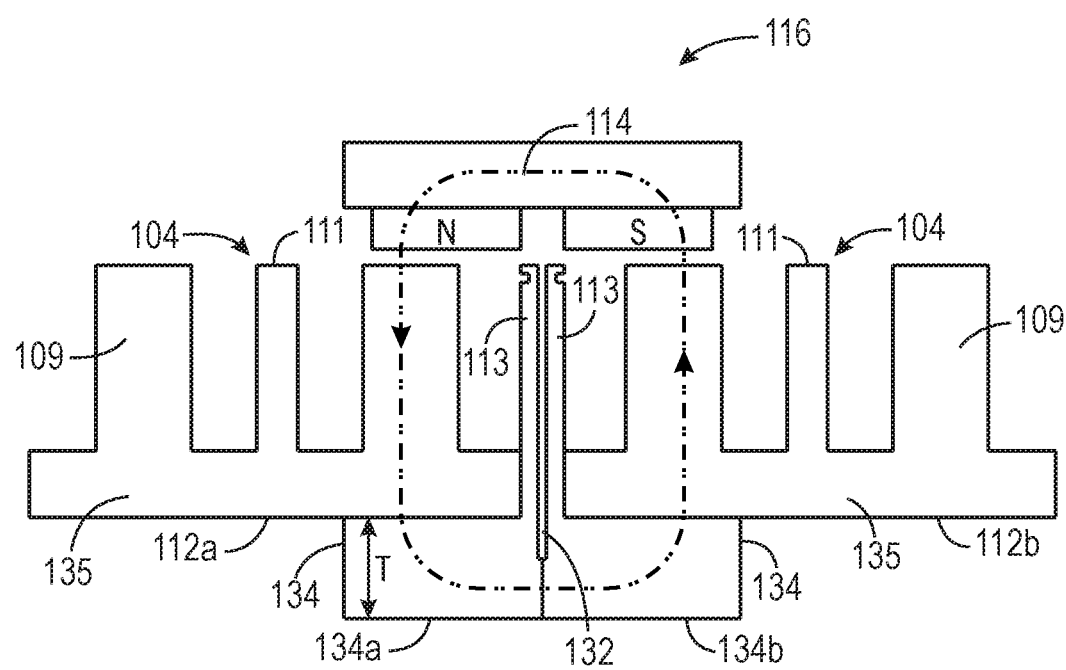
FIG. 6 is a schematic illustration of a side view of an example of an embodiment showing two adjacent track sections of a linear motion track connected together and having magnetic flux bridge in the form of a ferromagnetic plate effective for reducing any disruption, change, or weakening of the magnetic field between the two adjacent track sections.

As one way to address this concern, FIG. 6 illustrates an embodiment in which two adjacent track sections 104 of a linear motion track 102 are connected together and include a a magnetic flux bridge 134 effective for reducing disruption, change, or weakening of the magnetic field between the two adjacent track sections 104 created by gap 132 as shown in FIG. 4. The magnetic flux bridge 134 may be formed in two sections 134*a* and 134*b* positioned adjacent to each other and the stators 112*a* and 112*b*, respectively, such that that they minimize any disruption, change, or weakening in the magnetic field between two adjacent track sections 104 by providing a flux bridge over or bypassing the gap 132 between the adjacent track sections 104. As shown, the magnetic flux bridge 134 may be positioned and mounted to stators 112 to permit the magnetic flux 114 to flow such that the magnetic field is more consistent along or between the stators 112 of adjacent track sections 104, the magnetic flux bridge 134, and the mover 116. The magnetic flux bridge 134 may include a ferromagnetic plate or other similar structure directly connected to the stator 112 of each adjacent track section 104, along the underside of the stators 112. It should be understood that the size, such as thickness T, and the cross sectional area of the magnetic flux bridge 134 is dependent on the particular ferromagnetic material forming the magnetic flux bridge 134 and the strength of the magnetic field, and may be selected to ensure that the magnetic flux 114 is not saturated. It should be understood that adjacent surfaces of the magnetic flux bridge 134 may be precisely machined to sufficiently reduce or minimize any gap between the two surfaces, at least in a region through which the flux is to be directed. Such precise machining at such locations can be easily and inexpensively done, and reduces the need to precisely machine the entire adjacent surfaces of the stator sections 112*a* and 112*b*.

It should be noted that, in the embodiment illustrated in FIG. 6, each stator section 112*a* and 112*b* includes a generally contiguous base 135, with contiguous teeth 109 and 111 that face the mover 16 as it moves along the track sections. These stator sections may be made of multiple pieces of laminate material (e.g., magnetic steel) that may be stamped, cut, or otherwise formed, and then joined side-by-side to form the stator sections 112 illustrated. The teeth 109 and 111 may have different widths and spacing, as illustrated, and depending upon the mechanical, electrical, and magnetic design of the device. At locations corresponding to the location of the gap 132, end teeth 113 may be formed as illustrated. Such end teeth 113 may allow for some gap 132, or a portion of a gap, to remain, such as for attachment of a cover (not shown), or other mechanical, electrical, or magnetic reasons. However, in the illustrated embodiment, the gap 132 is reduced or substantially eliminated between the contiguous bases 135 such that flux 114 may be effectively channeled between the adjacent stator sections. The particular design for the laminations, and variants of such designs are also considered of interest in accordance with the present disclosure, for improving performance of the device.

Figure 7:
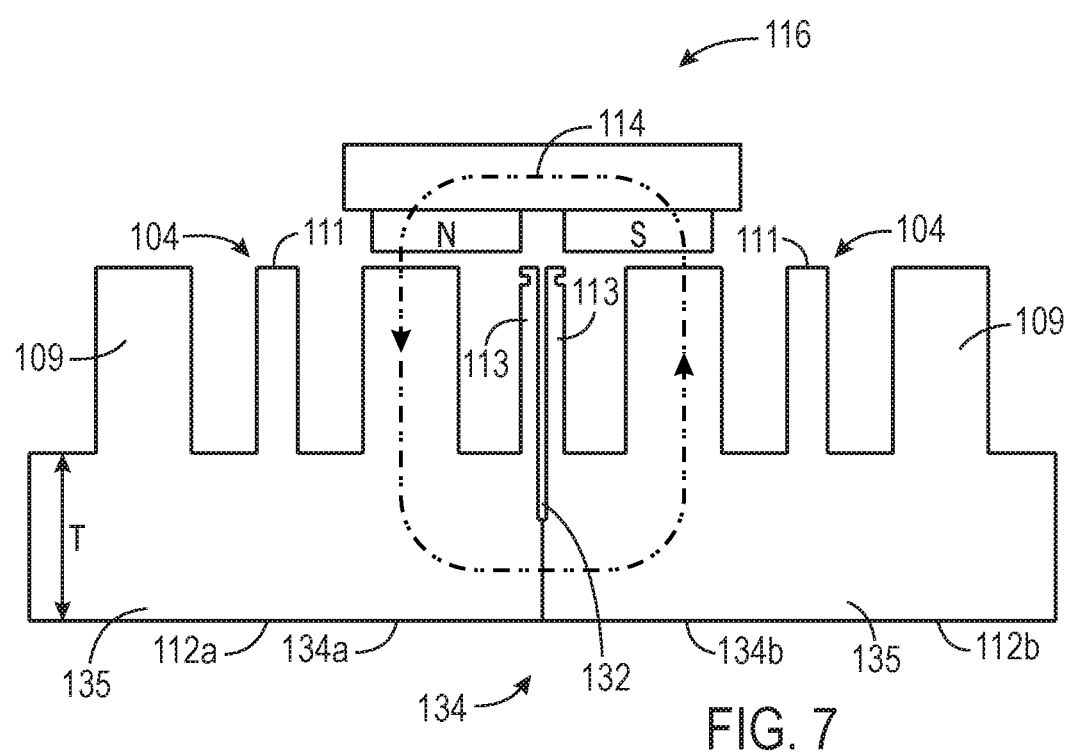
FIG. 7 is a schematic illustration of a side view of another example of an embodiment showing two adjacent track sections of a linear motion track connected together and having a magnetic flux bridge in the form of a ferromagnetic plate sections integral with the respective stators and effective for reducing any disruption, change, or weakening of the magnetic field between the two adjacent track sections.

Referring to FIG. 7, another embodiment is shown in which two adjacent track sections 104 of a linear motion track 102 are connected together and include a magnetic flux bridge 134 effective for reducing disruption, change, or weakening of the magnetic field between the two adjacent track sections 104. In this embodiment, the magnetic flux bridge 134 is formed in two sections 134a and 134b and each section is formed integral with respective stators 112a and 112b. In another embodiment, the two sections 134a and 134b are attached to the respective stators 112a and 112b, such as by bolts, screws, magnetically conductive adhesive, or other suitable method. The magnetic flux bridge 134 may comprise a ferromagnetic plate or other similar structure directly connected to the stator 112 of each adjacent track section 104, such as along the underside of the stators. Here again, it should now be understood that the size, such as thickness T, and the cross sectional area of the magnetic flux bridge 134 is dependent on the particular ferromagnetic material forming the magnetic flux bridge and the strength of the magnetic field, and may be selected to ensure that the magnetic flux 114 is not saturated. It should be understood, here again that adjacent surfaces 140 of the magnetic flux bridge 134 may be machined to sufficiently reduce or minimize any gap between the two surfaces, and that such machining can be easily and inexpensively done at flux-channeling locations to reduce the need to precisely machine the entire adjacent surfaces 142 of the stator sections 112a and 112b.

Here again, the stator sections 112a and 112b may be formed of stamped (or otherwise formed) laminate layers that are stacked to form the stator sections. The end teeth 113 of such laminates may approach one another while leaving a portion of a gap 132, while the contiguous bases 135 of the stator sections 112a and 112b, formed by the base of the laminates, may be extended by an extension E to approach one more closely to reduce or effectively eliminate the gap 132 to more effectively channel flux from one base section 135 (e.g., of stator section 112a) to the base section 135 of the adjacent stator section (e.g., 112b). Here again, the design of such stator sections, and of the laminates of which they may be comprised, are considered of interest as potentially significant advances in the art. In particular, in the illustrated design, the teeth 109 and 111 may be of different widths. The end teeth 113 and the extension E are sized such that when stator sections made of similar laminates are placed end-to-end, as shown, a base gap between adjacent base extensions is reduced or eliminated, while a gap 132 between the end teeth is maintained, and a total combined dimension of the gap 132 between the end teeth and widths of the adjacent end teeth 113 is approximately equal to a width of at least one of the plurality of teeth 111 (e.g., the narrower teeth shown in the figure).

Figure 8:
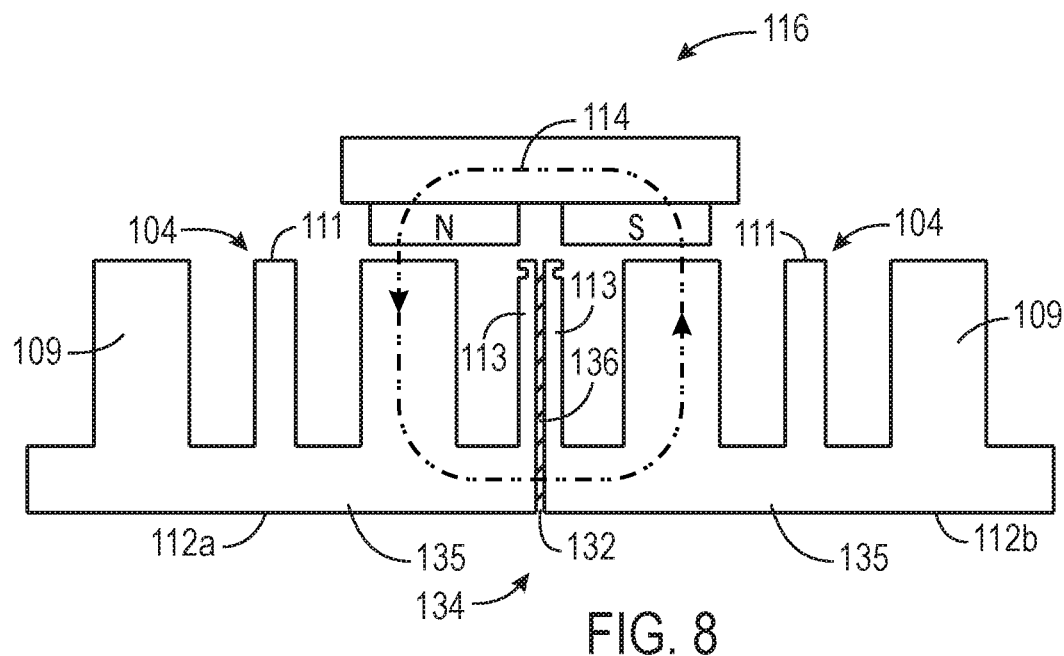
FIG. 8 is a schematic illustration of a side view of another example of an embodiment showing two adjacent track sections of a linear motion track connected together and a magnetic flux bridge in the form of a one or more ferromagnetic shims positioned within a gap formed between two adjacent track sections and effective for reducing disruption, change, or weakening of the magnetic field between the two adjacent track sections.

In another embodiment shown in FIG. 8, the magnetic flux bridge 134 includes one or more ferromagnetic shims 136 positioned within the gap 132 between adjacent track sections 104. In another embodiment shown in FIG. 9, the magnetic flux bridge 134 includes a magnetically conductive adhesive 138 positioned within the gap 132 between adjacent track sections 104. Here again, it should be apparent that the use of ferromagnetic shims 136 or magnetically conductive adhesive 138 reduces the need to precisely machine the adjacent surfaces 142 of the stator sections 112a and 112b.

Figure 9:
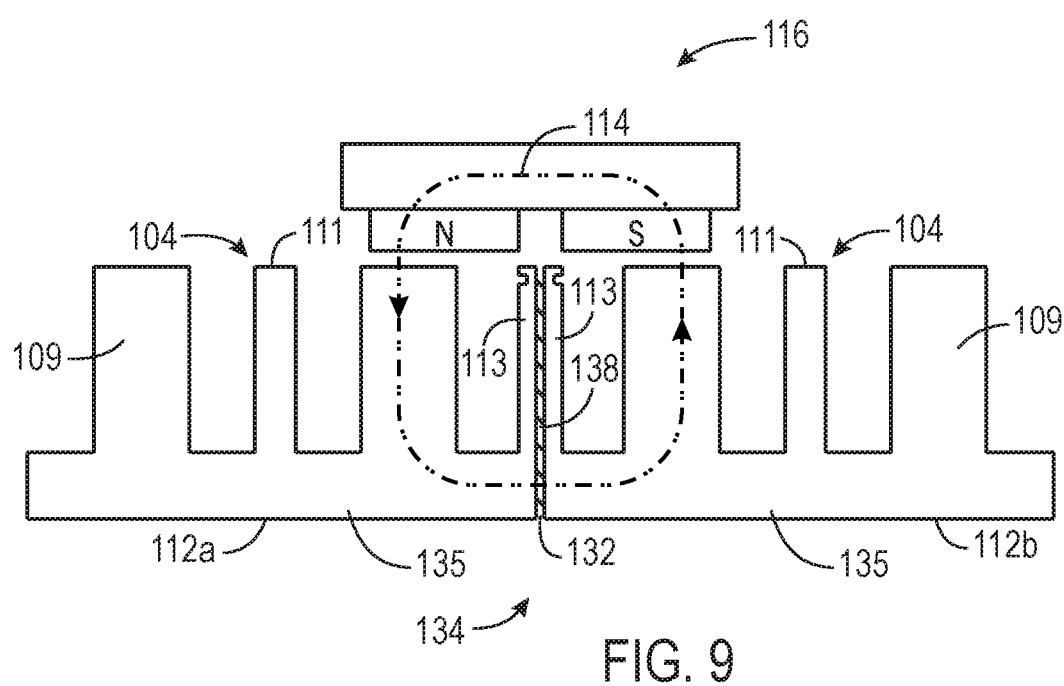
FIG. 9 is a schematic illustration of a side view of another example of an embodiment showing two adjacent track sections of a linear motion track connected together and a magnetic flux bridge in the form of a ferromagnetic adhesive positioned within the gap formed between two adjacent track sections and effective for reducing disruption, change, or weakening of the magnetic field between the two adjacent track sections.

It should be understood that the magnetic flux bridge 134 may include a ferromagnetic plate, such as shown in FIGS. 6 and 7; one or more ferromagnetic shims, such as shown in FIG. 8; magnetically conductive adhesives, such as shown in FIG. 9; or any combination thereof.

Figure 10:
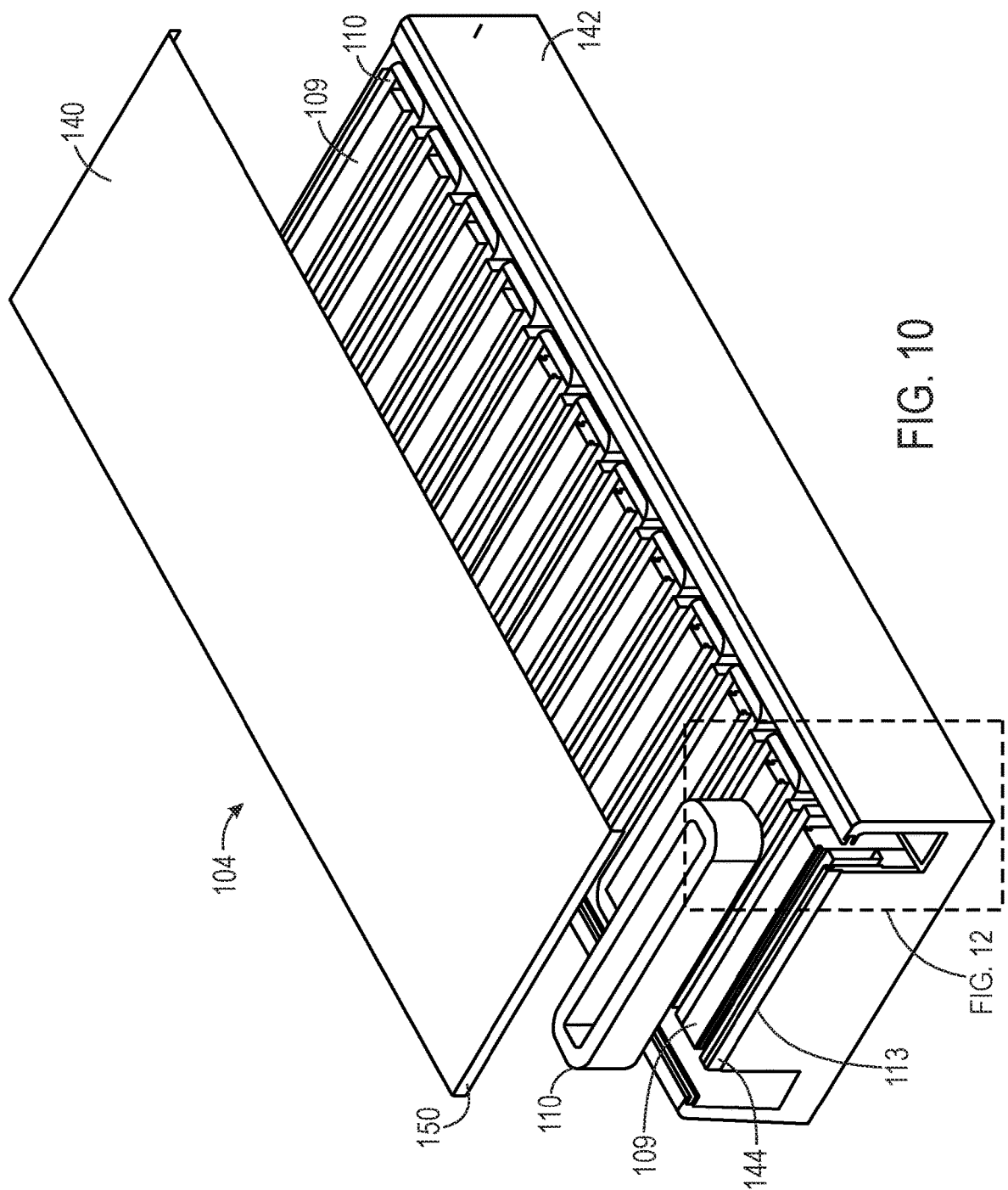
FIG. 10 is a schematic illustration of a partially exploded perspective view of an example of a track section having a cover.
Figure 11:
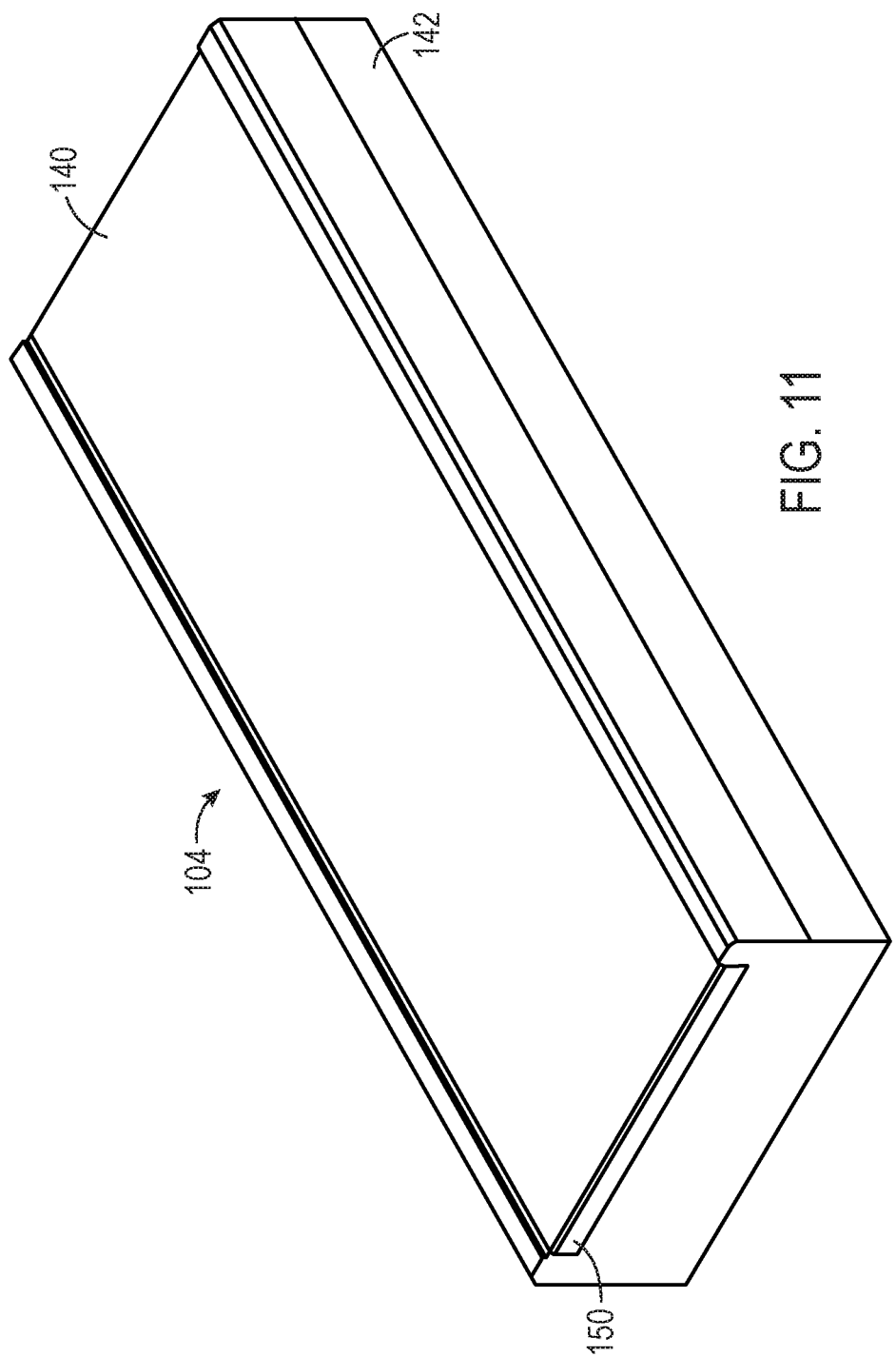
FIG. 11 is a schematic illustration of a perspective view of an example of an embodiment of the track section illustrated in FIG. 10 with the cover in place.

Although the embodiments described above mention that each of the track sections 104 may include a cover, no cover was specifically illustrated or discussed. Nonetheless, a cover is typically placed on each track section and the movers 116 are typically positioned above the cover. FIG. 10 illustrates an exploded view of an example of a track section 104 that includes a cover 140 to be placed over the elements of the magnetic motor system 106 that are disposed in a housing 142. Indeed, as can be seen in this exploded view, the magnetic motor system 106 includes the activation elements 108 defined by the teeth 109 and the electromagnetic coils 110, and each of the stator 112 is terminated by an end tooth 113. Advantageously, when the cover 140 is placed onto the housing 142, as illustrated in FIG. 11, the upper surface of the track section 104 is substantially planar to facilitate controlled and unimpeded movement of the movers 116. Furthermore, it should be noted that the ends of each track section 104 should form a substantially planar or flush surface as well. Similar to the embodiments described above, such a substantially planar end surface will facilitate the joining of adjacent track section to form a sufficient magnetic flux path and to reduce or eliminate any air gap that might cause a disruption of the magnetic flux.

Figure 12:
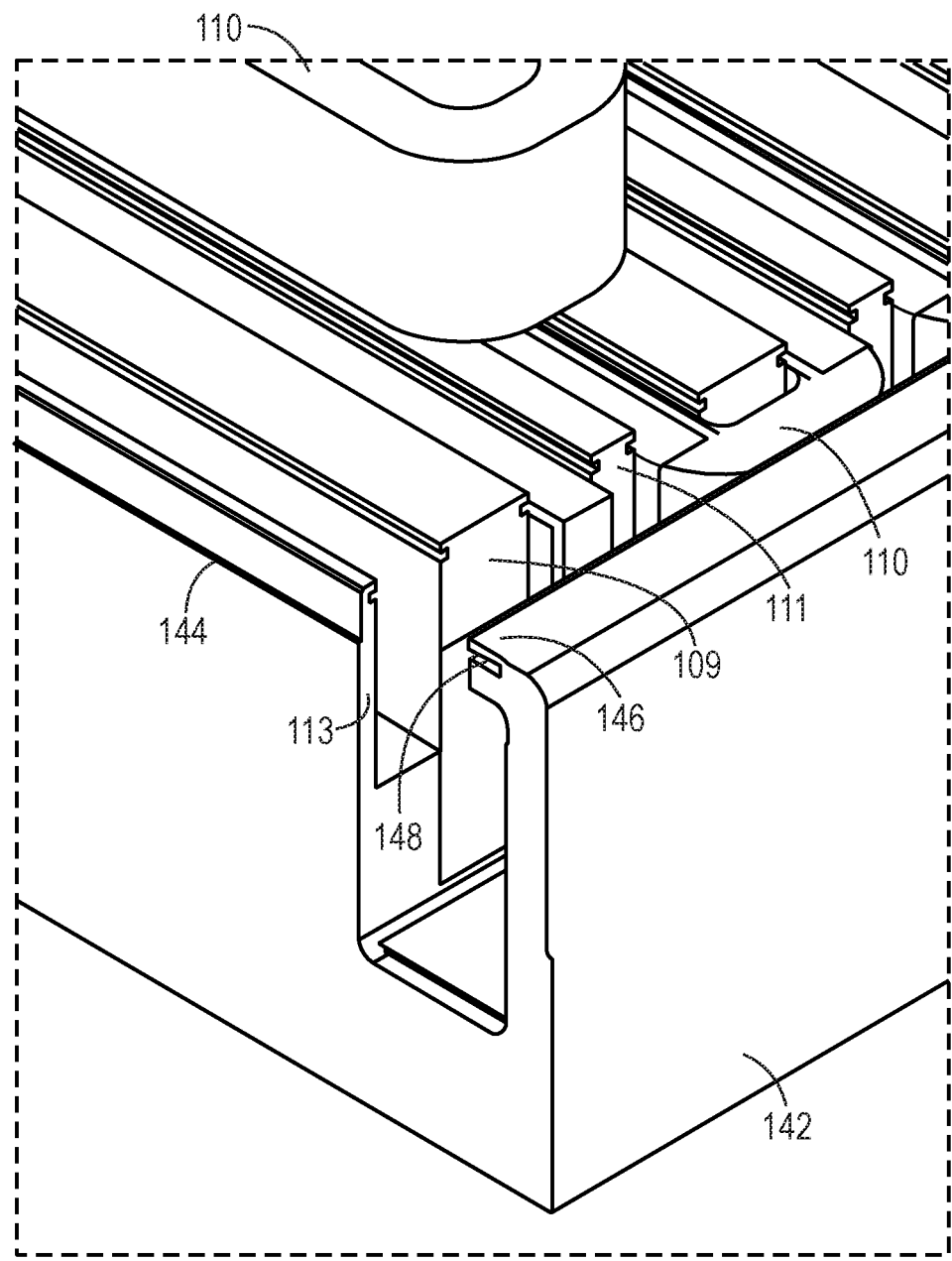
FIG. 12 is a schematic illustration of an expanded view of a portion of the track section illustrated in FIG. 10.

As illustrated in further detail in FIG. 12, the end of each track section 104 is formed by an end tooth 113, which further includes a recess 144 formed in an upper portion of the end tooth 113. As discussed in greater detail below, the length and width of the recess 144 may be sized to fit a lip 150 of the cover 140 so that the end of each track section 104 forms a substantially smooth and planar surface when the cover 104 is placed on the housing 142.

Figure 13:
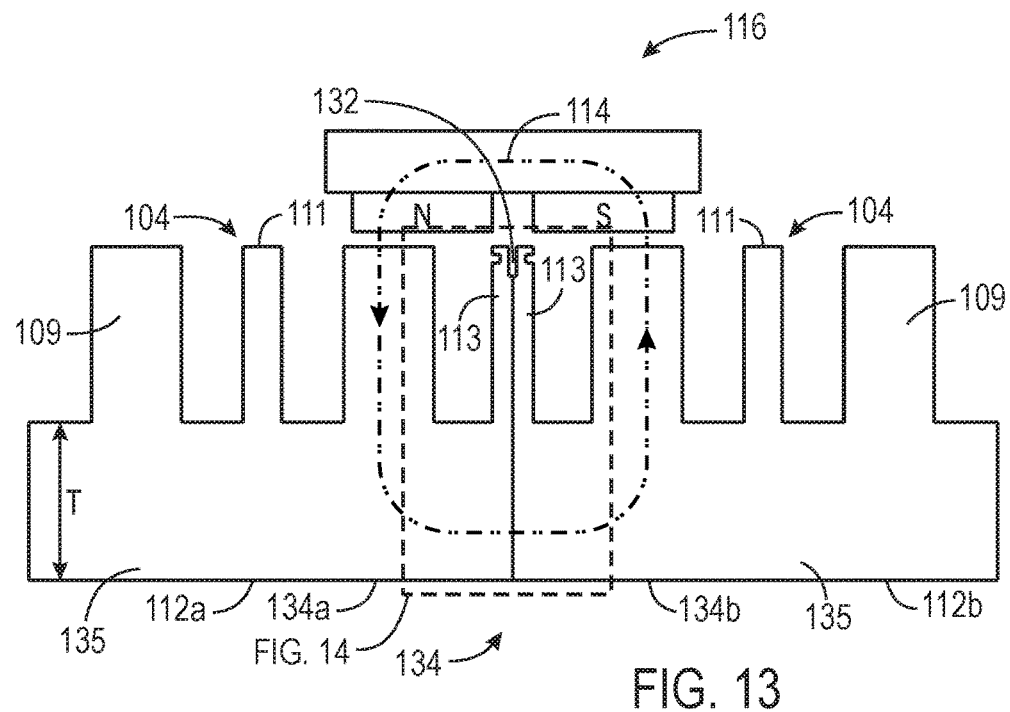
FIG. 13 is a schematic illustration of a side view of example of an embodiment showing two adjacent track sections of a linear motion track connected together and having a magnetic flux bridge in the form of ferromagnetic end teeth integral with the respective stators and having recesses configured to hold a lip portion of respective covers for reducing any disruption, change, or weakening of the magnetic field between the two adjacent track sections.

Turning also to FIG. 13, it can be seen that when the stators 112a and 112b of two adjacent track sections 104 are joined together, a magnetic flux bridge 134 is formed by the two sections 134a and 134b. However, unlike the previous embodiments, the sections 134a and 134b not only include the bases 135, but also a substantial portion of the end teeth 113. This not only forms a larger flux path, but also reduces the volume of the air gap 132. Like the embodiments described above, the two sections 134a and 134b may be formed integrally with the respective stators 112a and 112b, or they may be attached to the respective stators 112a and 112b.

Figure 14:
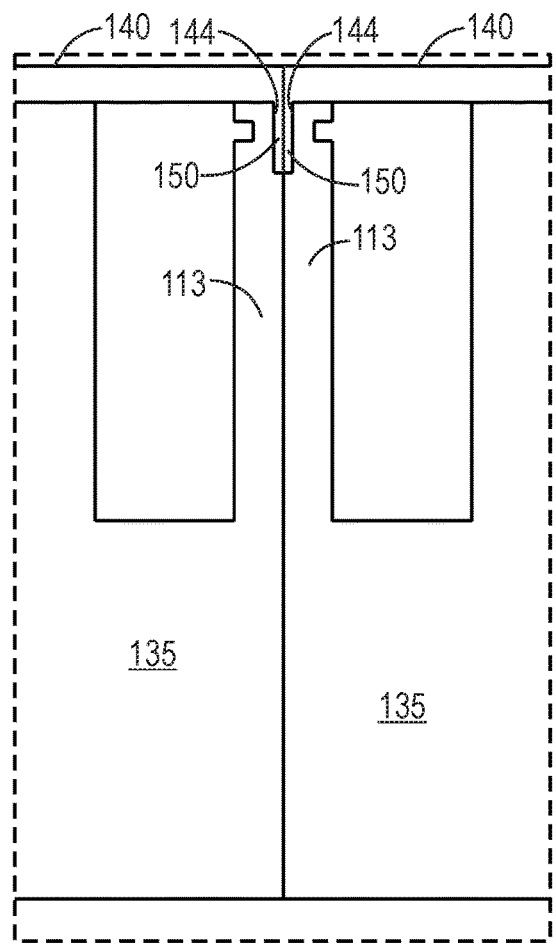
FIG. 14 is a schematic illustration of an expanded view of a portion of the two adjacent track sections illustrated in FIG. 13.

A detailed view of FIG. 13 is illustrated in FIG. 14. As can be seen, once the covers 140 are placed on each of the track sections 104, the lips 150 of each cover 140 extend downwardly into the respective recesses 144 to substantially eliminate the air gap 132 and to form an even larger flux path. Because the covers 140 are typically made of a ferromagnetic material, such as stainless steel, the magnetic flux bridge 134 formed by the two sections 134a and 134b in combination with the covers 140 and lips 150, form a magnetic flux path 114 that facilitates a magnetic flux that is substantially free from any disruptions or perturbations that may disrupt a mover 116 or that may cause a problem with the control system 124 or the associated position system 126, linear encoders 128, or control sensors 122.

Figure 15:
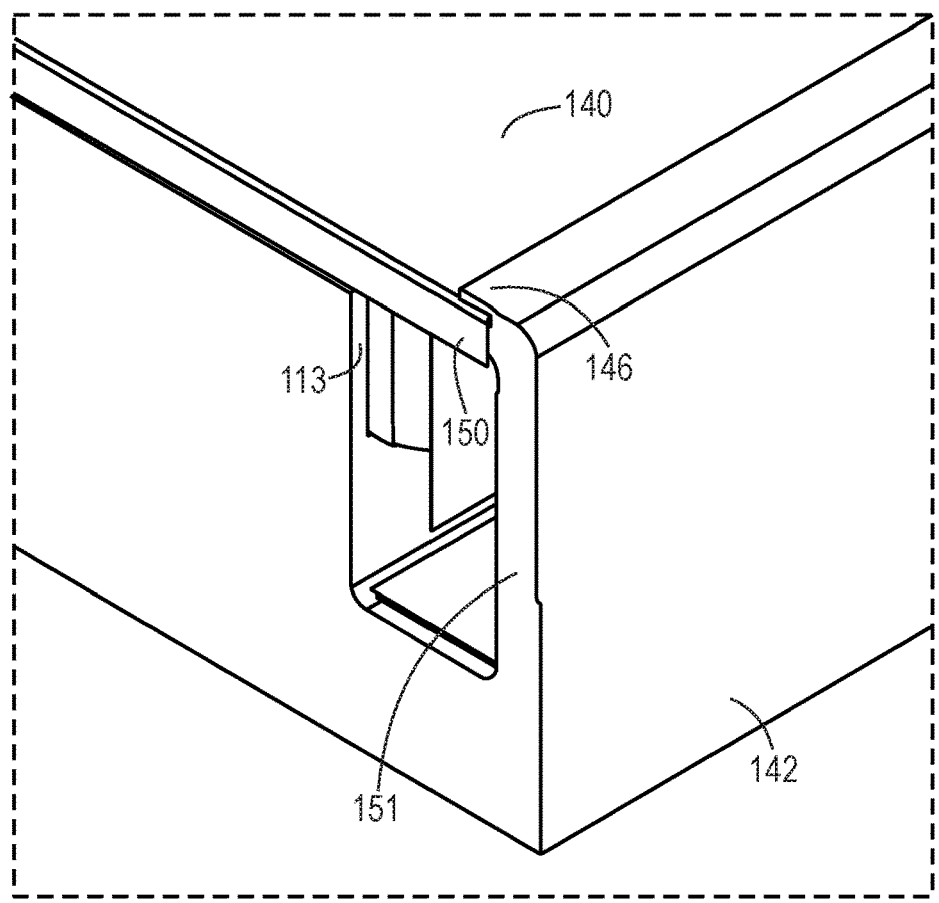
FIG. 15 is a schematic illustration of a detailed view of an end portion of a track section having a cover disposed thereon.
Figure 16:
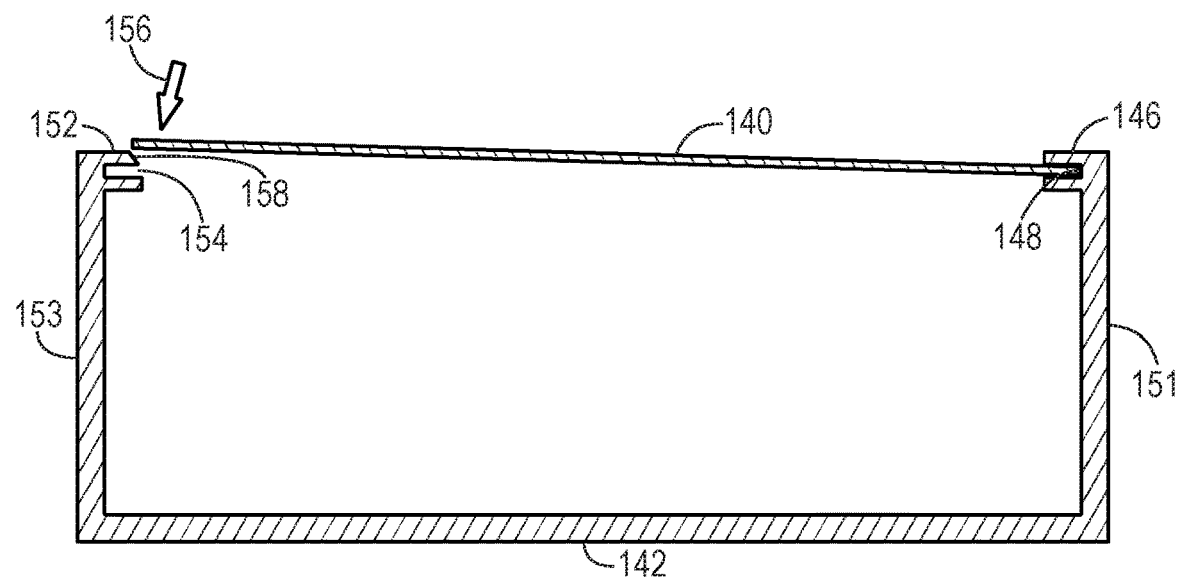
FIG. 16 is a schematic illustration of a cross section of a track section that illustrates the manner in which the cover may be placed onto the track section.

In addition, certain features of the housing 142 may facilitate the quick and accurate placement of the cover 140 over the magnetic motor system 106. As illustrated in FIGS. 12, 15, and 16, the housing 142 may include opposing sides 151 and 153. The top portion of the side 151 includes an inwardly extending flange 146 that includes a slot 148, and the top portion of the side 153 includes an inwardly extending flange 152 that includes a slot 154. In this embodiment, the slot 154 is relatively shallow compared to the slot 148. Hence, one edge of the cover 140 may be placed into the slot 148, then the other edge may be pushed downwardly in the direction of the arrow 156 until it snaps into place in the slot 154. The inwardly facing edge of the flange 152 may include a chamfered surface 158 that facilitates the movement of the edge of the cover 140 downwardly into the slot 154.

While this disclosure has set forth specific embodiments presently contemplated, it is evident that many alternatives, modifications and variations will be apparent to those skilled in the art. Accordingly, the embodiments set forth above are intended to be illustrative, not limiting. Various changes may be made without departing from the spirit and scope of the invention. Similarly, for example, it has been found that it may be desirable to provide a gap, such as between end teeth, with a magnetic filler "bridge" disposed within the gap. This may prevent or reduce a tendency to "cog" as the mover is displaced along the track sections, while only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A controlled motion system comprising:
    a track formed from track sections positioned adjacent to one another, each track section having a housing, a cover and a linear magnetic motor disposed in the housing, wherein each linear magnetic motor includes a first end tooth at a first end of the respective track section, a second end tooth at a second end of the respective track section, and a plurality of intervening teeth therebetween, electromagnetic coils configured to produce a magnetic flux being disposed adjacent to at least some of the plurality of intervening teeth;
    a mover mounted to move along the track by utilizing the magnetic flux; and
    a magnetic flux bridge coupling each of the adjacent track sections together, each magnetic flux bridge comprising the first and second respective end teeth of two adjacent track sections, wherein each of the first and second end teeth of the adjacent track sections comprise a conforming surface configured to abut against one another to form a magnetic flux path, and wherein each track section comprises structures to receive the respective cover.

2. The controlled motion system of claim 1, wherein the magnetic flux bridge comprises magnetically conductive material.

3. The controlled motion system of claim 1, wherein the magnetic flux bridge provides a substantially consistent magnetic field between the mover and adjacent track sections over which the mover moves.

4. The controlled motion system of claim 1, wherein each linear magnetic motor comprises a stator having the plurality of intervening teeth.

5. The controlled motion system of claim 4, wherein the first and second end teeth of each linear magnetic motor are integrally formed with the respective stator.

6. The controlled motion system of claim 4, wherein the first and second end teeth of each linear magnetic motor are separate pieces that are coupled to the respective stator.

7. The controlled motion system of claim 4, wherein substantially no air gap exists between the first and second respective end teeth of adjacent track sections when the respective covers are in place.

8. The controlled motion system of claim 1, wherein the housing comprises a first side and a second side opposing the first side, the first side having a first slot configured to accept a first side of the cover and the second side having a second slot configured to accept a second side of the cover.

9. The controlled motion system of claim 8, wherein the first slot is relatively shallow compared to the second slot.

10. The controlled motion system of claim 9, wherein the cover and the first and second slots are configured such that the first side of the cover may be snapped into the first slot after the second side of the cover is placed into the second slot.

11. The controlled motion system of claim 1, wherein each linear magnetic motor comprises a stator section having a base and first and second ends, wherein each of the first and second ends of the respective stator section comprises a substantially planar surface formed by each of the first and second respective end teeth and the base with the exception of recesses formed in an upper portion of each of the first and second end teeth.

12. The controlled motion system of claim 11, wherein each of the recesses is sized such that the substantially planar surface on each end of the respective stator section is substantially flush with lips of the respective cover when the cover is in place over the stator section.

13. The controlled motion system of claim 1, wherein the cover comprises first and second ends, each having the lip, wherein the cover is configured to be placed on the housing.

14. A controlled motion system comprising:
    a track formed from track sections positioned adjacent to one another, each track section having a housing, a cover and a linear magnetic motor disposed in the housing, wherein each linear magnetic motor includes a first end tooth at a first end of the respective track section, a second end tooth at a second end of the respective track section, and a plurality of intervening teeth therebetween, electromagnetic coils configured to produce a magnetic flux being disposed adjacent to at least some of the plurality of intervening teeth;
    a mover mounted to move along the track by utilizing the magnetic flux; and
    a magnetic flux bridge coupling each of the adjacent track sections together, each magnetic flux bridge comprising the first and second respective end teeth of two adjacent track sections, wherein each of the first and second end teeth of the adjacent track sections form a conforming surface configured to abut against one another to form a magnetic flux path, and wherein each track section comprises structures to receive the respective cover;
    wherein each linear magnetic motor comprises a stator section having a base and first and second ends, wherein each of the first and second ends of the respective stator section comprises a substantially planar surface formed by each of the first and second respective end teeth and the base.

15. The controlled motion system of claim 14, comprising recesses formed in an upper portion of each of the first and second end teeth.

16. The controlled motion system of claim 15, wherein each of the recesses is sized such that the substantially planar surface on each end of the respective stator section is substantially flush with the respective lips when the respective cover is in place over the stator section.

17. A controlled motion system comprising:
a track formed from track sections positioned adjacent to one another, each track section having a housing, a cover and a linear magnetic motor disposed in the housing and comprising a stator section have a base and first and second ends, a first end tooth at the first end, a second end tooth at the second end, and a plurality of intervening teeth, electromagnetic coils configured to produce a magnetic flux being disposed adjacent to at least some of the plurality of intervening teeth;
a mover mounted to move along the track by utilizing the magnetic flux; and
a magnetic flux bridge coupling each of the adjacent stator sections together, each magnetic flux bridge comprising the first and second respective end teeth of two adjacent stator sections, wherein the base and the first and second end teeth of the adjacent stator sections form a conforming surface configured to form a magnetic flux path, and wherein each track section comprises structures to receive the respective cover.

18. The controlled motion system of claim 17, wherein the first and second end teeth of each stator section comprise recesses for receiving the respective cover.

19. The controlled motion system of claim 18, wherein each of the recesses is sized such that the substantially planar surface on each end of the stator section is substantially flush with lips of the respective cover when the cover is in place over the respective stator section.

20. The controlled motion system of claim 17, wherein the first and second end teeth of each linear magnetic motor are integrally formed with the respective stator section.

* * * * *